United States Patent
White

(10) Patent No.: US 7,562,225 B2
(45) Date of Patent: Jul. 14, 2009

(54) TIMELINE PROTECTION

(75) Inventor: David White, Weymouth (GB)

(73) Assignee: NDS Limited, Middlesex (GB)

( * ) Notice: Subject to any disclaimer, the term of this patent is extended or adjusted under 35 U.S.C. 154(b) by 354 days.

(21) Appl. No.: 10/584,887

(22) PCT Filed: Dec. 21, 2004

(86) PCT No.: PCT/GB2004/005342

§ 371 (c)(1),
(2), (4) Date: Sep. 18, 2006

(87) PCT Pub. No.: WO2005/071973

PCT Pub. Date: Aug. 4, 2005

(65) Prior Publication Data

US 2007/0127720 A1 Jun. 7, 2007

Related U.S. Application Data

(60) Provisional application No. 60/539,670, filed on Jan. 27, 2004.

(30) Foreign Application Priority Data

Jan. 26, 2004 (GB) .................................. 0401627.5

(51) Int. Cl.
*H04L 9/12* (2006.01)
(52) U.S. Cl. ........................................ 713/178; 380/210
(58) Field of Classification Search ................... 713/178
See application file for complete search history.

(56) References Cited

U.S. PATENT DOCUMENTS 5,937,067 A * 8/1999 Thatcher et al. ............. 380/212
2003/0026423 A1 2/2003 Unger et al.

2003/0110229 A1 * 6/2003 Kulig et al. ................. 709/207
2004/0111613 A1 6/2004 Shen-Orr et al.

FOREIGN PATENT DOCUMENTS

| EP | 1 172 953 | 1/2001 |
|---|---|---|
| EP | 1 432 228 | 6/2004 |
| WO | WO 02/079955 | 10/2002 |

(Continued)

OTHER PUBLICATIONS

International Standard ISO/IEC 13818-1, Second Edition, pp. 1-154; Dec. 1, 2000.*

(Continued)

*Primary Examiner*—Ayaz R Sheikh
*Assistant Examiner*—Brett Squires
(74) *Attorney, Agent, or Firm*—Husch Blackwell Sanders LLP Welsh & Katz

(57) ABSTRACT

A method and system for timecode generation including: receiving an encryption key and an implemented encryption method, for each one of a plurality of frames, receiving a timecode and an associated presentation time stamp (PTS) associated with the one frame, for each one of the plurality of frames, encrypting the timecode associated with the one frame using the encryption key and the implemented encryption method, thereby producing a plurality of encrypted timecodes, and at a time associated with the associated PTS associated with the one frame, outputting a packetized elementary stream (PES) including the plurality of encrypted timecodes. Related systems and methods are also described.

33 Claims, 8 Drawing Sheets

FOREIGN PATENT DOCUMENTS

WO     WO 03/084208     10/2003

OTHER PUBLICATIONS

Figure 1A:
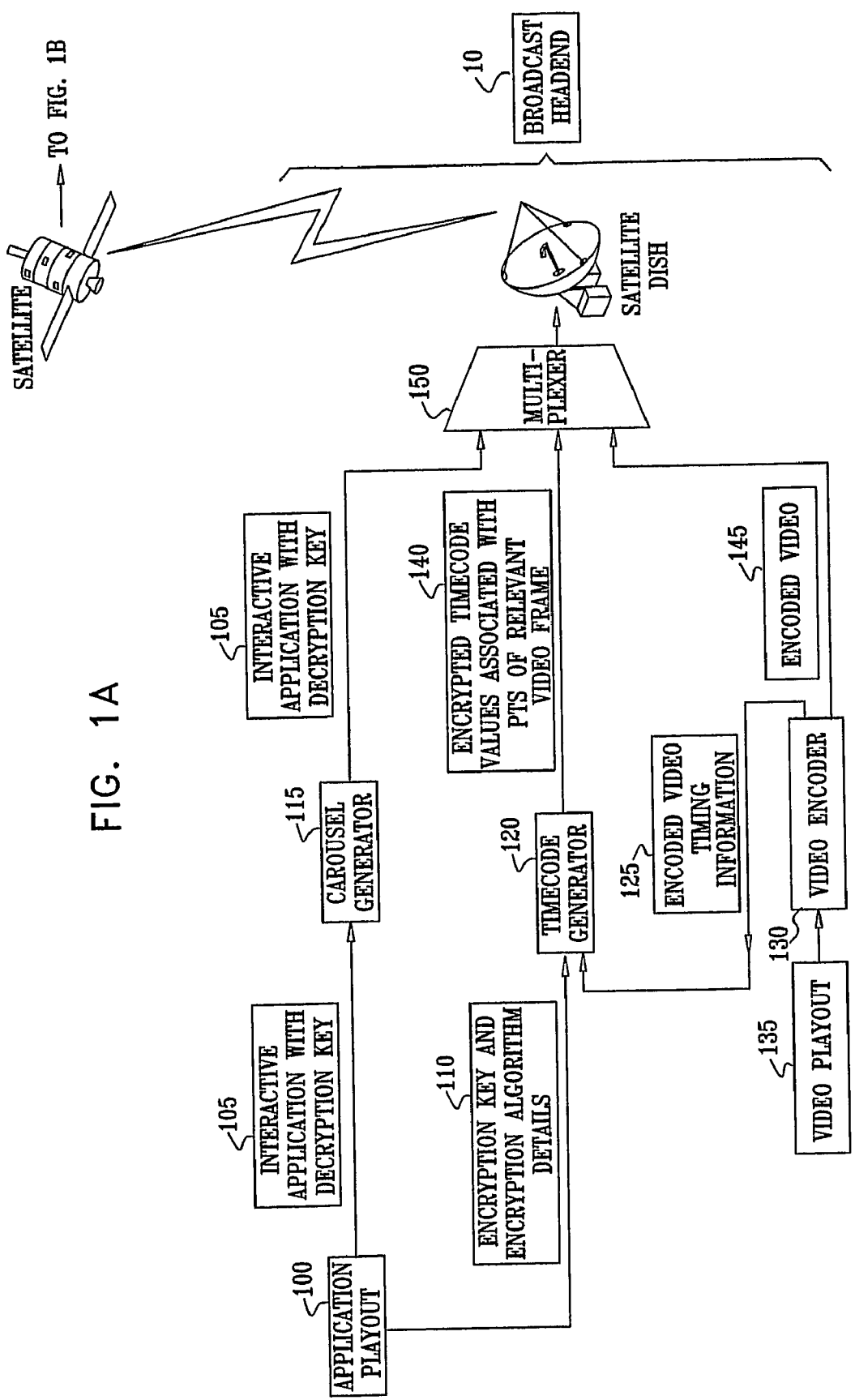

Broadcast and On-Line Services: Search, select and rightful use of content on personal storage systems ("TV-Anytime Phase 1"); Part 3: Metadata; Sub-part 1: Metadata schemas (ETSI TS 102 822-3-1 (V1.1.1), 2003).

Broadcast and On-Line Services: Search, select and rightful use of content on personal storage systems ("TV-Anytime Phase 1"); Part 3: Metadata; Sub-part 2: System aspects in a uni-directional environment (ETSI TS 102 822-3-2 (V1.1.1), 2003).

Information Technology-Generic Coding of Moving Pictures and Associated Audio Information Part 6: Extensions for Digital Storage Media Command and Control (ISO/IEC 13818-6, Amendment 2, Jun. 1, 2000).

* cited by examiner

TIMELINE PROTECTION

RELATED APPLICATION INFORMATION

The present application claims the benefit of priority from UK patent application number GB 0401627.5 of NDS Limited, filed 26 Jan. 2004, and corresponding U.S. provisional application No. 60/539,670 of David White, filed 27 Jan. 2004, the disclosures of which are hereby incorporated herein by reference.

FIELD OF THE INVENTION

The present invention relates to audio and video encoding systems, and more particularly to media timelines in video and audio encoding systems and the use of such timelines by broadcast applications.

BACKGROUND OF THE INVENTION

Published PCT Patent Application WO 02/079955 of NDS Ltd., and corresponding U.S. patent application Ser. No. 10/472,286 of Shen Orr et al., the disclosures of which are hereby incorporated herein by reference, describe a system and method for providing variable security mechanisms for securing digital content, in which a single security mechanism is not used for all content. Rather, at least one characteristic or feature of the security mechanism is varied between units, instances or categories of content. Hence, even if unauthorized access is gained to a single unit of content, the overall integrity and security of the system for content distribution is not compromised. Security is preferably provided through a general mechanism, which is then varied in order to provide variable, dissimilar security schemes for different types of content.

The following standards are also believed to be of relevance to the present invention:

ETSI TS 102 822-3 Broadcast and On-line Services: Search, select, and Rightful Use of Content on Personal Storage Systems ("TV-Anytime Phase 1"); Part 3: Metadata.

ISO/IEC 13818-6 Information Technology Generic Coding of Moving Pictures and Associated Audio Information Part 6: Extensions for Digital Storage Media Command and Control.

The disclosures of WO 02/079955; US 2004/0111613 A1 (publication of U.S. application Ser. No. 10/472,286): ETSI TS 102 822-3: and ISO/IEC 13818-6, are hereby incorporated herein by reference.

SUMMARY OF THE INVENTION

The term "timeline" is used throughout the present specification and claims to refer to a record of the progression of time from a start of content within a stream of audio/visual data. Metadata and interactive applications can be authored to have specific events occur at specific points of a timeline, thereby synchronizing the metadata and interactive applications to the content. In order to maintain synchronization of metadata or of an interactive application, the timeline for the content needs to pause during advertisement breaks.

However, having a timeline that comprises pauses for advertisement breaks may reveal where advertisement breaks occur in programs. If a Personal Video Recorder (PVR) can determine where an advertisement break is, then the PVR can be programmed to automatically skip the advertisements. Skipping of advertisements puts income to broadcasters from advertisers at risk.

The present invention, in preferred embodiments thereof, provides a method for protecting a timeline so that only authorized devices or applications can access the timeline. The method described can be used to protect platforms without a conditional access system. For example, and without limiting the generality of the foregoing, a terrestrial broadcaster, utilizing the present invention, may securely broadcast, without conditional access protection, a channel that is ordinarily broadcast with conditional access protection by a satellite broadcaster. The terrestrial broadcaster may broadcast the channel without conditional access protection since the timeline associated with content on the channel is encrypted.

The inventor of the present invention believes that Normal Play Time (NPT) has been rejected as the timecode format to use for segmentation information, and believes that NPT is also due to be replaced as the format for the Multimedia Home Platform (MHP). The solution that the inventor of the present invention believes will be adopted involves timecode delivered in a Packetized Elementary Stream (PES) stream.

The present invention, in preferred embodiments thereof, is based on using a timeline delivered as timecode; a timecode is a time reference used to identify an instant in a streamed media such as audio or video. A common format of timecode value is hours, minutes, seconds, and frames, which is used to identify a particular frame of video. Alternatively, a timecode may also be a simple count of frames or, for audio, a value in milliseconds. The details of a preferred embodiment of timecode expression are described below, with reference to Appendix A. The timeline can be adapted to work with a system based on defining an offset, for example an offset from the MPEG system time clock (STC) such as normal play time (NPT) (refer to ISO/IEC 13818-6), an offset from broadcast headend station time, or an offset from a video timecode.

A timeline delivered as video timecode has a constant stream of timecode (a frame count, for example) closely tied to the video, possibly delivered in the adaptation field of packets or as a separate media stream (such as audio, video or data) with a Presentation Time Stamp (PTS) for each timecode value. The PTS type of timeline, a preferred implementation of which is described below, is easier to use in a PVR than is NPT, as the PTS timeline saves on receiver resources.

Throughout the present disclosure, timecode is expressed in the form HH:MM:SS:FF, where HH is hours, MM is minutes, SS is seconds, and FF is frames.

A timeline may be delivered as an offset from another timeline, for example, and without limiting the generality of the foregoing, as an offset from "station time". Station time is the synchronization clock with which the broadcaster works. Station time increments throughout the day, and does not pause at advertisement breaks. For example, and without limiting the generality of the foregoing, if at midnight, station time is 00:00:00:00, six hours, twelve minutes, thirty seven seconds and four frames later, the station time would be 06:12:37:04. A timeline is preferably delivered as an offset from station time, and is preferably delivered with the station time. For example, if a sporting event is scheduled to be broadcast starting at 8:00 PM, and the first advertisement break is scheduled to be at 8:12 PM, then, in addition to regularly delivered station time, two timeline offsets would be delivered. A first timeline offset indicates the start of the sporting event at an offset of 20:00:00:00 from midnight station time. A second timeline offset indicates the start of an advertisement break at an offset of 20:12:00:00 from midnight station time. The tenth frame of the sporting event would occur 20:00:00:10 after midnight station time. Applications or segmentation using the first timeline offset would subtract the offset of 20:00:00:00 from the time 20:00:00:10, and would therefore refer to the tenth frame of the sporting event as 00:00:00:10. Similarly, applications or segmentation using the second timeline offset would refer to the tenth frame of the advertisement break as 00:00:00:10.

In preferred embodiments of the present invention, timecode values or timeline offset values are preferably encrypted using an encryption key. The timeline values can then preferably be decrypted by a trusted device or application.

The use of trusted applications is preferred because using trusted devices is not always possible; for example, and without limiting the generality of the foregoing, use of trusted devices is not generally possible in a horizontal market. Furthermore, the producer of the content and of the application is the party most interested in protecting the timeline, while manufacturers are arguably the ones most interested in opening up the timeline. In preferred embodiments of the present invention, a trusted application can have an embedded decryption key and a decryption algorithm. Moving the location of the key data and changing the algorithm would provide a moving target for receiver manufacturers wishing to implement advertisement skipping.

An implication of the present invention is that the application would manage monitoring the timeline and triggering of stream events. Reducing the frequency of timecode samples and using interpolation to fill in gaps can reduce additional processing overhead. Also, the encryption used does not need to be extremely secure in itself; the security comes more from moving the location of the key data and changing the algorithm. A preferred example of appropriate techniques which are believed to be suitable for moving the location of the key data and changing the algorithm is found in Published PCT Patent Application WO 02/079955 of NDS Ltd., and corresponding U.S. patent application Ser. No. 10/472,286 of Shen Orr et al., referred to above and incorporated herein by reference. Also, the inventors of the present invention believe that ad-skipping is not a feature that people or organizations would put large amounts of resources into if encryption were used, because the value of skipping advertisements is low compared to the value of the content itself.

In certain preferred embodiments of the present invention, it is the responsibility of a receiver to pass an encrypted timecode value to the application at the time indicated by the PTS for the timecode value. The receiver cannot determine when a timeline pauses or restarts, or when stream events occur. Therefore the receiver cannot determine where advertisements are from the timeline.

There is thus provided in accordance with a preferred embodiment of the present invention a timecode generation method including receiving an encryption key and an implemented encryption method, for each one of a plurality of frames, receiving a timecode and an associated presentation time stamp (PTS) associated with the one frame, for each one of the plurality of frames, encrypting the timecode associated with the one frame using the encryption key and the implemented encryption method, thereby producing a plurality of encrypted timecodes, and at a time associated with the associated PTS associated with the one frame, outputting a packetized elementary stream (PES) including the plurality of encrypted timecodes.

Further in accordance with a preferred embodiment of the present invention the implemented encryption method includes an asymmetric encryption method.

Still further in accordance with a preferred embodiment of the present invention the implemented encryption method includes a symmetric encryption method.

Additionally in accordance with a preferred embodiment of the present invention the timecode includes an offset from a broadcast headend station time.

Moreover in accordance with a preferred embodiment of the present invention the one frame includes at least one of the following video, audio, and data.

There is also provided in accordance with another preferred embodiment of the present invention a timecode generation method including receiving an encryption key and an implemented encryption method, for each one of a plurality of frames, receiving a timecode and an associated decoding time stamp (DTS) associated with the one frame, the DTS occurring in advance of a presentation time stamp (PTS) associated with the one frame, for each one of the plurality of frames, encrypting the timecode associated with the one frame using the encryption key and the implemented encryption method, thereby producing a plurality of encrypted timecodes, and at a time associated with the associated DTS associated with the one frame, outputting a packetized elementary stream (PES) including the plurality of encrypted timecodes, the PES including the plurality of encrypted timecodes not being effective until a time associated with the PTS associated with the one frame.

Further in accordance with a preferred embodiment of the present invention the implemented encryption method includes an asymmetric encryption method.

Still further in accordance with a preferred embodiment of the present invention the implemented encryption method includes a symmetric encryption method.

Additionally in accordance with a preferred embodiment of the present invention the timecode includes an offset from a broadcast headend station time.

Moreover in accordance with a preferred embodiment of the present invention the one frame includes at least one of the following video, audio, and data.

There is also provided in accordance with still another preferred embodiment of the present invention a timecode generator including a first input unit operative to receive an encryption key and an implemented encryption method, a second input unit operative to receive a timecode and an associated presentation time stamp (PTS) for each one of a plurality of frames, an encryptor operative to encrypt the timecode for each one of the plurality of frames, using the encryption key and the implemented encryption method, thereby producing a plurality of encrypted timecodes, and a packetized elementary stream (PES) outputter operative to receive a plurality of encrypted timecodes and, at a time associated with the associated presentation time stamp (PTS) associated with the one frame, to output a PES including the plurality of encrypted timecodes.

Further in accordance with a preferred embodiment of the present invention the encryptor is operative to asymmetrically encrypt the timecode.

Still further in accordance with a preferred embodiment of the present invention the encryptor is operative to symmetrically encrypt the timecode.

Additionally in accordance with a preferred embodiment of the present invention the second input unit receives timecode as an offset from a broadcast headend station time.

Moreover in accordance with a preferred embodiment of the present invention the one frame includes at least one of the following video, audio, and data.

There is also provided in accordance with another preferred embodiment of the present invention a timecode use method including receiving an application file including a decryption key and an implemented decryption method, receiving a packetized elementary stream (PES) including a plurality of encrypted timecodes, each of the plurality of timecodes being associated with a presentation time stamp (PTS), and running the application file, the running including performing the following when a system time clock (STC) value equals a PTS value associated with at least one of the plurality of encrypted timecodes decrypting the encrypted timecode associated with the PTS value using the decryption key and the implemented encryption method, thereby producing a decrypted timecode.

Further in accordance with a preferred embodiment of the present invention the decrypting includes asymmetric decrypting.

Still further in accordance with a preferred embodiment of the present invention the decrypting includes symmetric decrypting.

Additionally in accordance with a preferred embodiment of the present invention each of the plurality of timecodes includes an offset from a broadcast headend station time.

There is also provided in accordance with still another preferred embodiment of the present invention a timecode use method including receiving an application file including a decryption key and an implemented decryption method, receiving a packetized elementary stream (PES) including a plurality of encrypted timecodes, each of the plurality of encrypted timecodes being associated with a decoding time stamp (DTS), at least one of the plurality of encrypted timecodes requiring that a display be updated at one of a plurality of presentation time stamps (PTS), running the application file, the running including performing the following when a system time clock (STC) value equals a DTS value associated with at least one of the plurality of encrypted timecodes decrypting the encrypted timecode associated with the DTS value using the decryption key and the implemented encryption method, thereby producing a decrypted timecode, and updating the display at the one of the plurality of PTSs.

Further in accordance with a preferred embodiment of the present invention the decrypting includes asymmetric decrypting.

Still further in accordance with a preferred embodiment of the present invention the decrypting includes symmetric decrypting.

Additionally in accordance with a preferred embodiment of the present invention each of the plurality of timecodes includes an offset from a broadcast headend station time.

There is also provided in accordance with another preferred embodiment of the present invention a timecode handler including a first input unit operative to receive at least one application file including a decryption key and an implemented encryption method, a second input unit operative to receive a packetized elementary stream (PES) including a plurality of encrypted timecodes, each of the plurality of encrypted timecodes being associated with a presentation time stamp (PTS), and a decryptor receiving each of the plurality of encrypted timecodes and operative to decrypt each of the plurality of encrypted timecodes using the decryption key and the implemented encryption method when a system time clock (STC) value equals a PTS value associated with each of the plurality of encrypted timecodes.

Further in accordance with a preferred embodiment of the present invention the decryptor is operative to asymmetrically decrypt each of the plurality of encrypted timecodes.

Still further in accordance with a preferred embodiment of the present invention the decryptor is operative to symmetrically decrypt each of the plurality of encrypted timecodes.

Additionally in accordance with a preferred embodiment of the present invention each of the plurality of encrypted timecodes includes an offset from a broadcast headend station time.

There is also provided in accordance with still another preferred embodiment of the present invention a method for timeline protection including receiving, at a timecode generator, an encryption key and an implemented encryption method, for each one of a plurality of frames, receiving, at the timecode generator, a timecode and an associated presentation time stamp (PTS) associated with the one frame, for each one of the plurality of frames, encrypting, at the timecode generator, the timecode associated with the one frame using the encryption key and the implemented encryption method, thereby producing a plurality of encrypted timecodes, at a time associated with the associated presentation time stamp (PTS) associated with the one frame, outputting a packetized elementary stream (PES) including the plurality of encrypted timecodes, receiving, at a timecode handler, an application file including a decryption key and an implemented decryption method, receiving, at the timecode handler, the PES including a plurality of encrypted timecodes, each of the plurality of timecodes being associated with a presentation time stamp (PTS), and running the application file, the running including at the application file, performing the following when a system time clock (STC) value equals a PTS value associated with at least one of the plurality of encrypted timecodes decrypting the encrypted timecode associated with the PTS value using the decryption key and the implemented encryption method, thereby producing a decrypted timecode.

There is also provided in accordance with another preferred embodiment of the present invention a system for timeline protection including a timecode generator including a timecode generator first input unit operative to receive an encryption key and an implemented encryption method, a timecode generator second input unit operative to receive a timecode and an associated presentation time stamp (PTS) for each one of a plurality of frames, a timecode generator encryptor operative to encrypt the timecode for each one of the plurality of frames, using the encryption key and the implemented encryption method, thereby producing a plurality of encrypted timecodes, a timecode generator packetized elementary stream (PES) outputter operative to receive a plurality of encrypted timecodes and, at a time associated with the associated presentation time stamp (PTS) associated with the one frame, to output a PES including the plurality of encrypted timecodes, and a timecode handler including a timecode handler first input unit operative to receive at least one application file including a decryption key and an implemented decryption method, a timecode handler second input unit active to receive the PES including a plurality of encrypted timecodes, each of the plurality of encrypted timecodes being associated with a presentation time stamp (PTS), and a timecode handler decryptor receiving each of the plurality of encrypted timecodes and operative to decrypt each of the plurality of encrypted timecodes using the decryption key and the implemented encryption method when a system time clock (STC) value equals a PTS value associated with each of the plurality of encrypted timecodes.

BRIEF DESCRIPTION OF THE DRAWINGS AND APPENDIX

Figure 7:
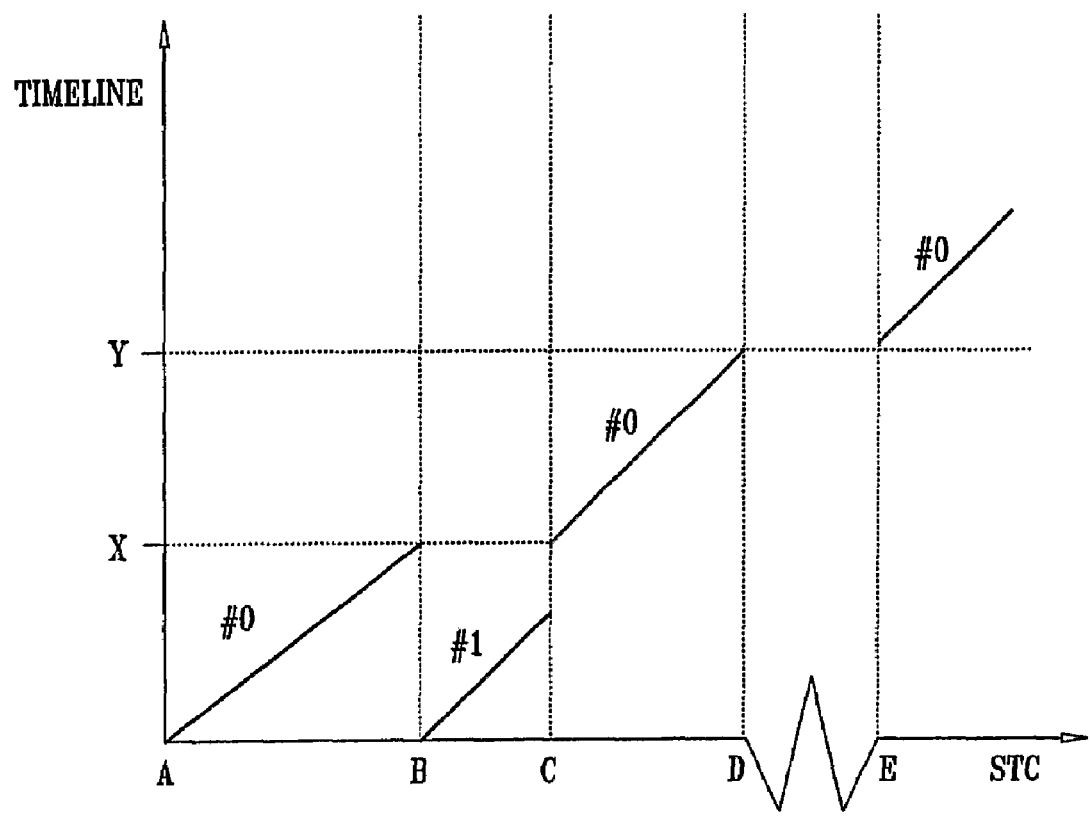

The present invention will be understood and appreciated more fully from the following detailed description, taken in conjunction with the drawings in which:

FIGS. 1A and B, taken together, comprise a simplified partly pictorial, partly block diagram illustration of a system for timeline protection, constructed and operative in accordance with a preferred embodiment of the present invention;

FIGS. 2-6 are simplified flowchart illustrations of alternative preferred methods of operation of the system of FIGS. 1A and B, in accordance with preferred embodiments thereof; and FIG. 7 is a graphical diagram of timeline plotted against System Time Clock (STC), useful for understanding the system of FIGS. 1A and B.

The following Appendix may be helpful in understanding certain preferred embodiments of the present invention:

Appendix A is a tabular presentation of a format of a preferred embodiment of a timecode packet for unencrypted timecode values, and of an encryption header for delivering the timecode packet.

DETAILED DESCRIPTION OF A PREFERRED EMBODIMENT

Figure 1B:
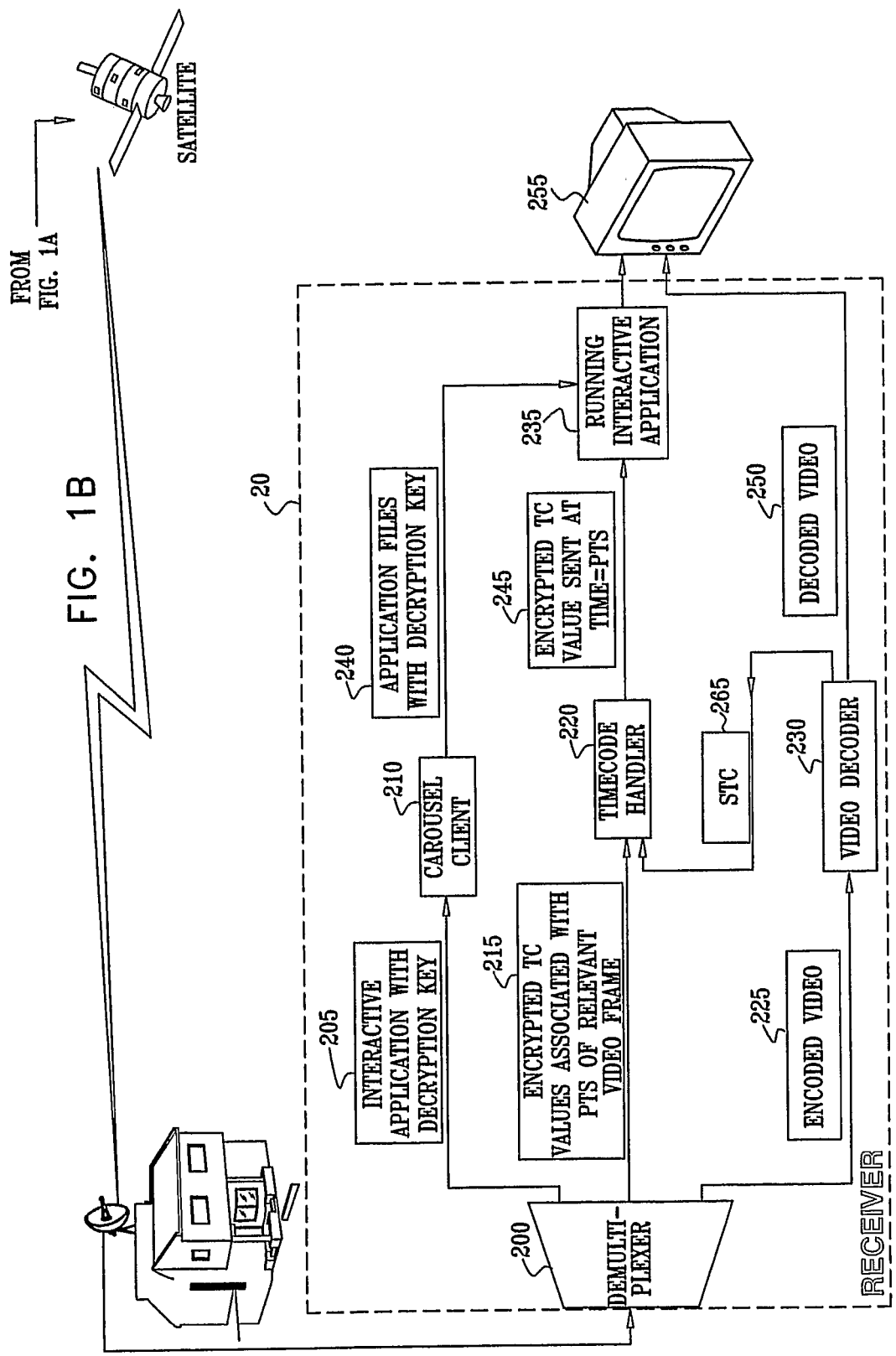
Figure 2:
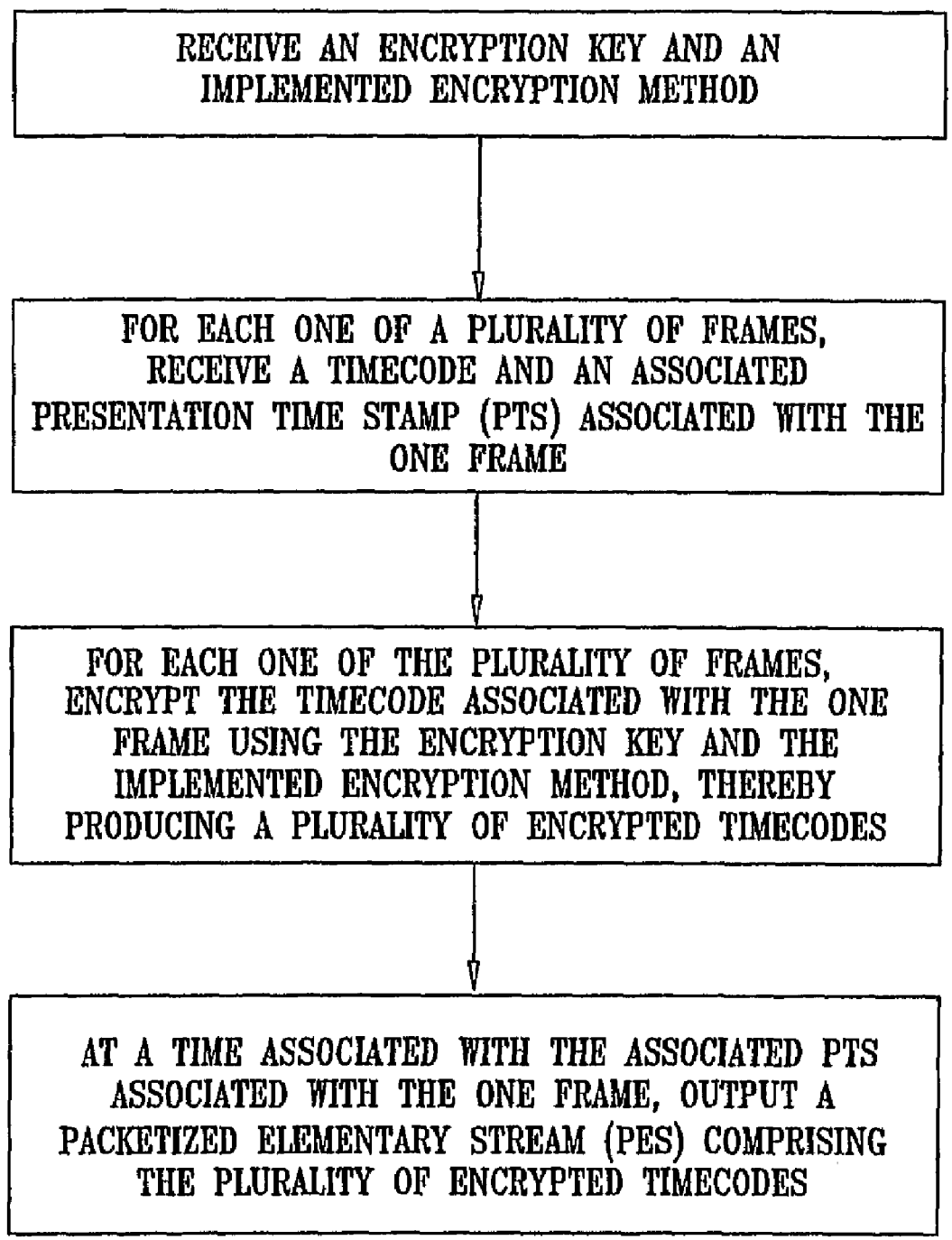
Figure 3:
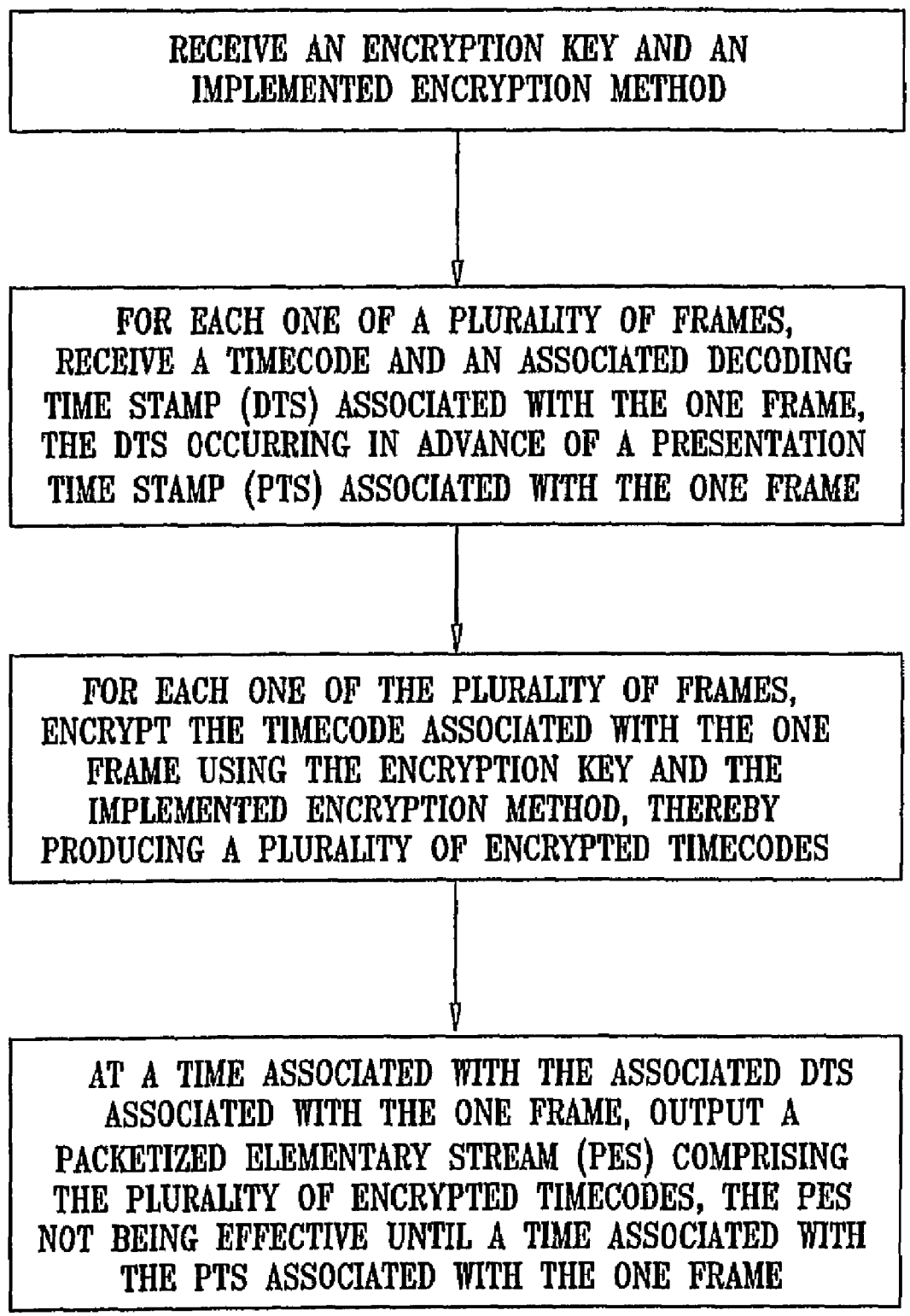
Figure 4:
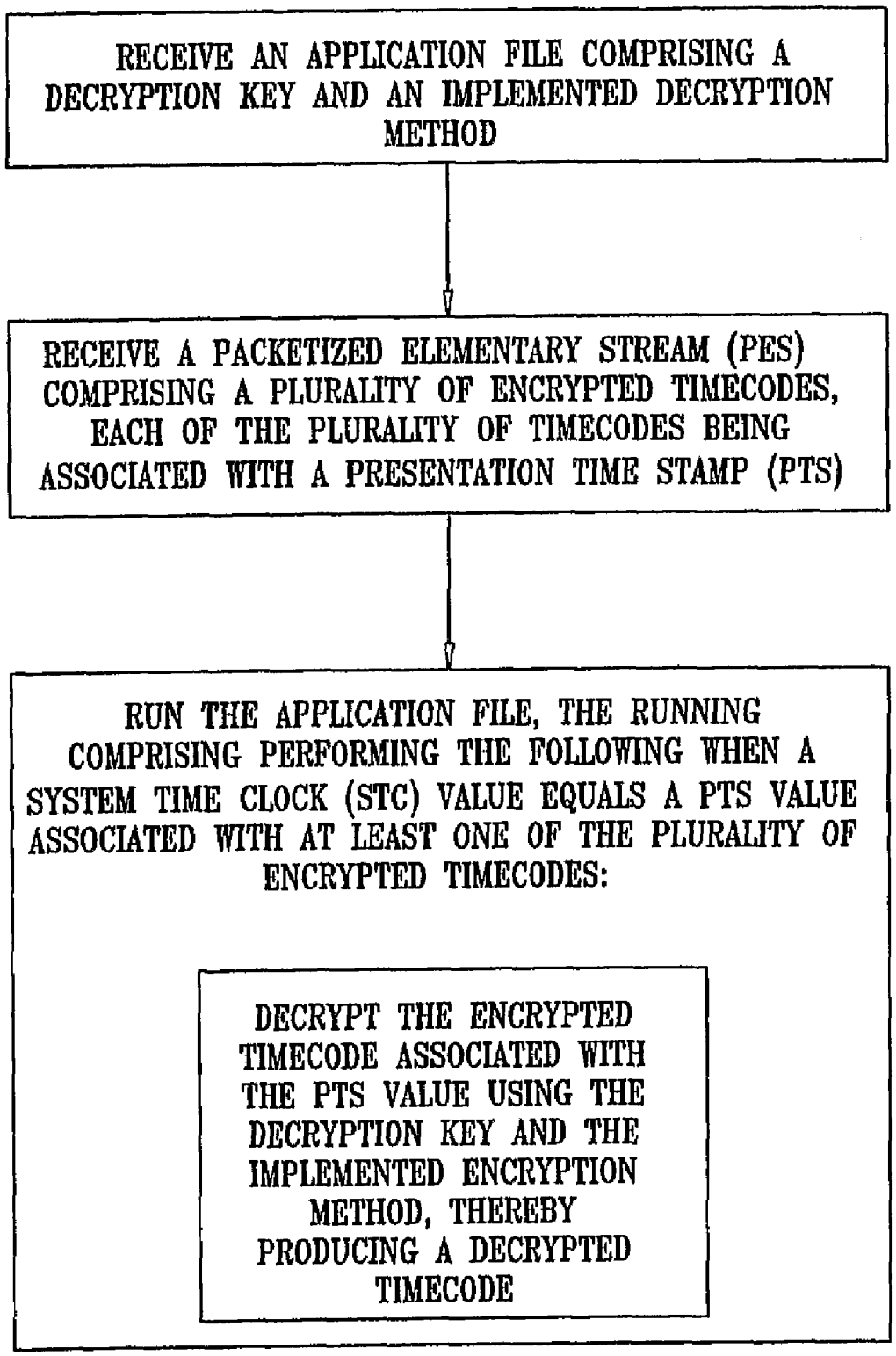
Figure 5:
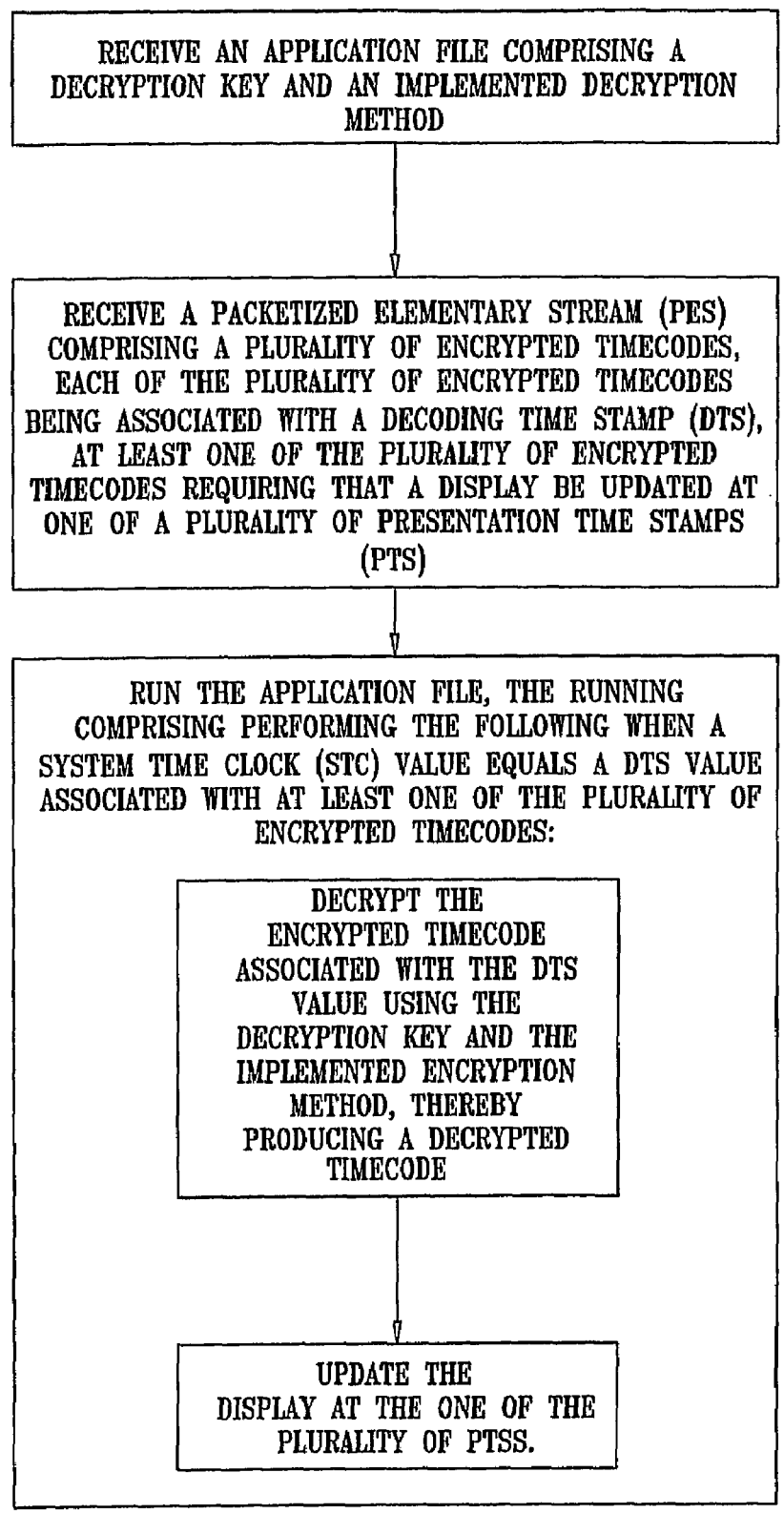
Figure 6:
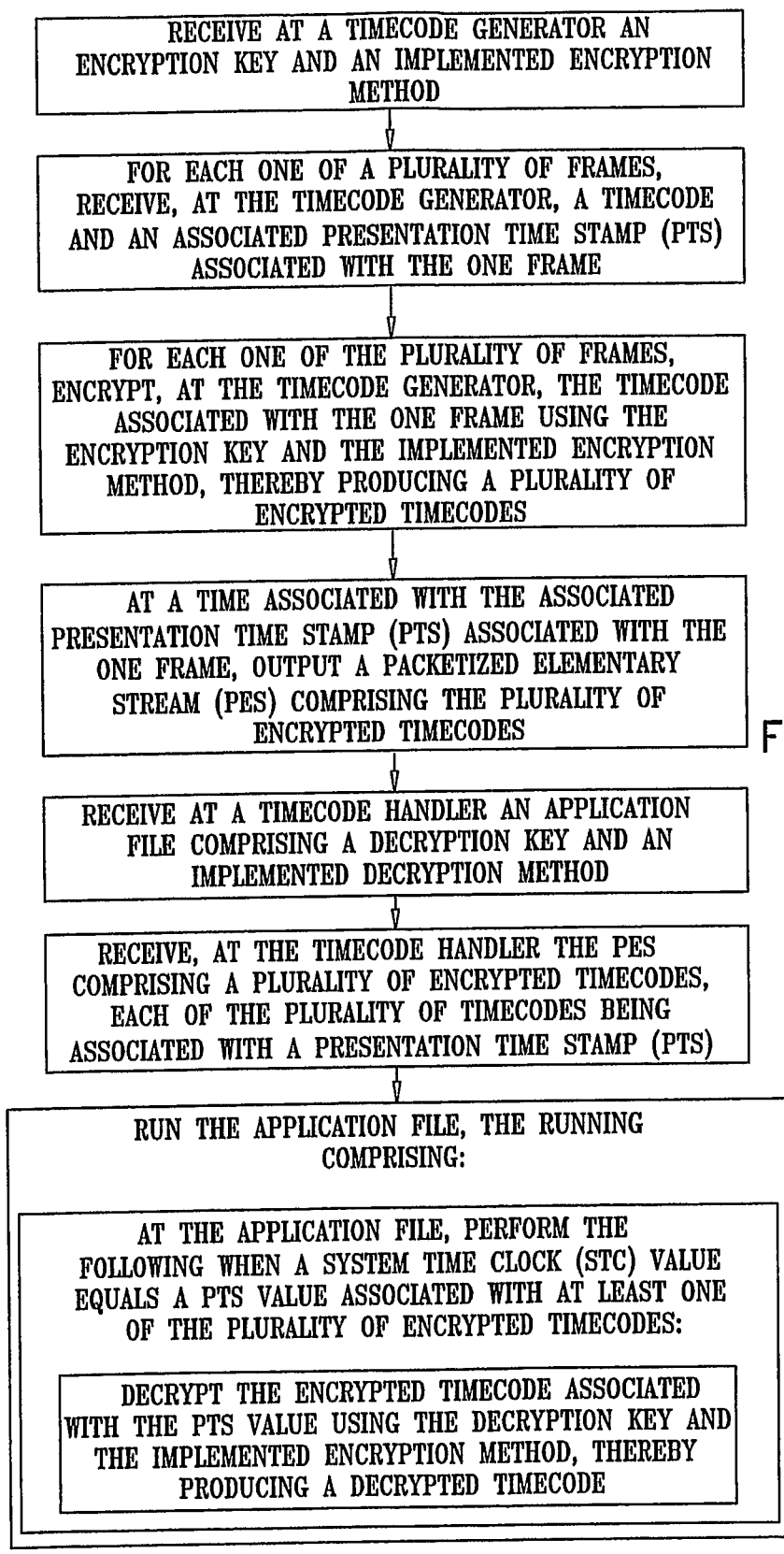

Reference is now made to FIGS. 1A and B, which taken together, comprise a simplified partly pictorial, partly block diagram illustration of a system for timeline protection, constructed and operative in accordance with a preferred embodiment of the present invention. In the description of FIGS. 1A and B, a preferred embodiment of the present invention is described by way of example as implemented in a broadcast headend and a broadcast receiver, it being understood that preferred embodiments of the present invention can be implemented on any appropriate system implementing timecodes and timelines. FIG. 1A comprises a simplified partly pictorial, partly block diagram illustration of a broadcast headend system for timeline protection, constructed and operative in accordance with a preferred embodiment of the present invention. FIG. 1B comprises a simplified partly pictorial, partly block diagram illustration of a broadcast receiver system for timeline protection, constructed and operative in accordance with a preferred embodiment of the present invention. Each of FIGS. 1A and 1B will be described in greater detail below.

It is appreciated that each of the broadcast headend system depicted in FIG. 1A and the broadcast receiver system depicted in FIG. 1B may comprise an alternative preferred embodiment of the present invention, without the other elements shown in the corresponding other figure.

The implementation described can be adapted in a number of ways. For example, and without limiting the generality of the foregoing, the present invention may be adapted for audio-only content, data-only content, or by using different methods of encryption (such as, for example, public/private key encryption, symmetric encryption, asymmetric encryption, or any other appropriate type of encryption).

A possible enhancement of a preferred implementation of the present invention is to use both decode time stamps (DTS) and presentation time stamps (PTS) for PES carrying timecode values. The application is passed an encrypted timecode value when STC=DTS, giving the application time to prepare for a display to be updated when the PTS occurs.

In an alternative preferred embodiment of the present invention, timeline may be delivered as an offset from "station time". Station time is the synchronization clock with which the broadcaster works. Station time increments throughout the day, and does not pause at advertisement breaks. The broadcast headend delivers station time as unencrypted timecode throughout the day. A timeline is preferably delivered as an offset from station time, and is preferably delivered with the station time. For example, if a sporting event is scheduled to be broadcast starting at 8:00 PM, and the first advertisement break is scheduled to be at 8:12 PM, then, in addition to regularly delivered station time, two encrypted timeline offsets would be delivered. A first timeline offset indicates the start of the sporting event at an offset of 20:00:00:00 from midnight station time. A second timeline offset indicates the start of an advertisement break at an offset of 20:12:00:00 from midnight station time. The tenth frame of the sporting event would occur 20:00:00:10 after midnight station time. Applications or segmentation using the first timeline offset would subtract the offset of 20:00:00:00 from the time 20:00:00:10, and would therefore refer to the tenth frame of the sporting event as 00:00:00:10. Similarly, applications or segmentation using the second timeline offset would refer to the tenth frame of the advertisement break as 00:00:00:10. An example of operation of the system of FIGS. 1A and B is given below with reference to the discussion of FIG. 7.

Station time and the encrypted offsets are preferably delivered as PES packets carrying timecode values. The application receiving the offset preferably calculates synchronization points by adding the offset to station time. Those skilled in the art will appreciate that distributing multiple timelines as an offset from station time is beneficial as a method for saving on receiver resources.

It is appreciated that the headend and the receiver preferably comprise conventional elements implemented in hardware and software. For ease of depiction, as well as in the interest of brevity, only portions of the headend or receiver relevant to the present invention are depicted or described. For example, and without limiting the generality of the foregoing, conventional components used for audio encoding, A/V encryption, and so forth, are all omitted from the figures and description.

Reference is now specifically made to FIG. 1A, which comprises a simplified partly pictorial, partly block diagram illustration of a broadcast headend 10 system for timeline protection, constructed and operative in accordance with a preferred embodiment of the present invention.

An interactive application using an encrypted timeline is preferably provided, the application comprising two distinct parts: the interactive application 105 itself to be broadcast, the interactive application itself also comprising a decryption key and algorithm; and an encryption key and encryption algorithm 110 to be used at the broadcast headend. An application playout system 100 preferably provides the data files to a carousel generator 115 just prior to broadcast of content to which the interactive application is synchronized.

As mentioned above, the interactive application 105 also comprise the decryption key and algorithm. The decryption key and algorithm are preferably operative to decrypt timecode at the broadcast receiver. At least the decryption key and algorithm are preferably obfuscated in a broadcast data stream. For example, and without limiting the generality of the foregoing, the method and system described in Published PCT Patent Application WO 02/079955 of NDS Ltd., and corresponding U.S. patent application Ser. No. 10/472,286 of Shen Orr et al., referred to above and incorporated herein by reference, would provide an appropriate method and system for obfuscating the parts of the interactive application.

The carousel generator 115 preferably delivers the interactive application 105 and the decryption key and algorithm in an appropriate delivery format such as, and without limiting the generality of the foregoing, as a Digital Storage Media—

Command and Control (DSM-CC) object carousel or data carousel. The DSM-CC carousel is delivered to a broadcast multiplexer 150.

The encryption key and encryption algorithm 110 are preferably provided to a timecode generator 120. The timecode generator 120 also preferably receives a feed of timing information 125 from a video encoder 130. The composition of timing information 125 by the video encoder is typically performed as follows:

the video encoder receives a video playout 135;

after encoding the video playout 135, the video encoder 130 provides to the timecode generator 120, for each video frame, the timecode value for the frame and the PTS of the frame; and the video encoder 130 further provides encoded video 145 to the multiplexer 150.

In addition to providing encoded video, the video encoder 130 provides timecode-to-PTS information to the timecode generator 120. Many MPEG video encoders embed Vertical Interval Timecode (VITC) in Group of Pictures (GOP) headers, thereby providing timecode-to-PTS information. The timecode generator 120 can then extract the timecode-to-PTS information from the GOP headers comprised in the encoded video 145.

It is appreciated that the multiplexer 150 is preferably configured using standard methods known in the art to accept the new timecode elementary stream 140.

As mentioned above, the timecode generator 120 preferably uses the encryption algorithm provided by the application playout system 100. Downloading a new application, which implements a different encryption algorithm, easily changes the encryption algorithm, thereby making it disadvantageous for pirates to implement receivers that can crack one specific encryption algorithm. It is appreciated that the interactive application is preferably broadcast by a carousel, well known in the art, thereby making the interactive application frequently available for download.

The timecode generator 120 creates a PES stream comprising values of timecode 140. The timecode values 140 are encrypted by the timecode generator 120 using the encryption algorithm provided by the interactive application. The PES stream comprising the encrypted timecode is synchronized to the encoded video 145 using the PES packet structure to associate one of a plurality of PTSs with each encrypted timecode value. A specific PTS associated with an encrypted timecode value matches that of a corresponding encoded video frame from the video encoder.

It is appreciated that in some preferred implementations of the present invention it may not be necessary to insert a timecode value for every frame. For example, and without limiting the generality of the foregoing, in a PVR environment the present invention may be implemented using encrypted timecode values only for the first GOP of a recorded stream.

The timecode generator 120 preferably produces timecode irrespective of whether an application requires timecode values. Otherwise, the absence of timecode may be sufficient to indicate where advertisements are located in a data stream. The indication of the location of advertisements may, thereby, enable PVRs and similar devices to skip advertisements.

Reference is now made specifically to FIG. 1B, which comprises a simplified partly pictorial, partly block diagram illustration of a broadcast receiver 20 system for timeline protection, constructed and operative in accordance with a preferred embodiment of the present invention.

A demultiplexer 200 is preferably configured by software comprised in the broadcast receiver 20 to extract the PES associated with a broadcast service as a whole from a broadcast transport stream. The demultiplexer 200 preferably streams extracted interactive application data 205 comprising the decryption key to a carousel client 210. The demultiplexer 200 passes the timecode elementary stream 215, comprising encrypted values of timecode, to a timecode handler 220. The demultiplexer 200 also passes the encoded video 225 to a video decoder 230.

It is appreciated that many different configurations of receiver hardware and software may be used in order to implement the demultiplexer 200 functionality. Specifically, it is appreciated that a particular receiver may not have a logical unit identifiable as a "demultiplexer" but the particular receiver will possess a way of extracting data from within a DVB data stream. PVRs may be complex in the way that data is internally routed, and thus there may be more than one logical demultiplexing unit in a PVR receiver. The choice of which logical demultiplexing unit in a PVR receiver is used depends on whether the data originates on an internal PVR storage unit or if the data originates in a broadcast stream.

The carousel client 210 preferably retrieves interactive application code 205 for execution by the broadcast receiver 20. Once the interactive application 235 is running, the interactive application 235 preferably uses the carousel client 210 to retrieve files from a broadcast carousel. The decryption key comprised in the interactive application files 240 has preferably been obfuscated, as described above.

As mentioned above, the video decoder 230 receives encoded video 225 from the multiplexer 200. The video decoder 230, in turn, outputs decoded video 250 to a video display 255. The video decoder 230 also provides STC information 265 to the timecode handler 220.

The timecode handler 220 also receives the timecode elementary stream 215 from the demultiplexer 200. The timecode handler 220, in turn, passes the encrypted timecode values 245 to the interactive application 235 when a system time clock (STC) value equals the time given by the PTS for the timecode PES packet.

The interactive application files 240 delivered by the carousel client 210 preferably produce a running interactive application 235. The interactive application 235 preferably comprises the decryption key and algorithm, thereby enabling the interactive application to decode the encrypted timecode values.

The interactive application 235 comprises resource files which preferably detail which values of the timecode comprise one of a plurality of synchronization points occurring in the decoded video 250. The interactive application 235 preferably decrypts and monitors incoming encrypted timecode values 245. When one of the plurality of synchronization points occurs, the interactive application 235 preferably updates the video display 255, or the behavior of the interactive application in a way that is synchronous to the decoded video 255.

If there are gaps in the incoming timecode, the interactive application 235 interpolates the intermediate values. For example, and without limiting the generality of the foregoing, a timecode value may only be given for a first frame of a GOP. To perform such an interpolation requires additional triggers, which indicate to the interactive application 235 when intermediate frames are displayed, for the inbetween frames. Either the timecode handler 220 or the video decoder 230 preferably provides the triggers.

Reference is now made to FIGS. 2-6, which are simplified flowchart illustrations of alternative preferred methods of operation of the system of FIGS. 1A and B, in accordance with preferred embodiments thereof. The methods of FIG.

2-6 are believed to be self explanatory with reference to the above discussion of FIGS. 1A-B.

Reference is now made to Appendix A, which is a tabular presentation of a format of a preferred embodiment of a timecode packet for unencrypted timecode values, and of an encryption header for delivering the timecode packet. A basic textual syntax for timecode is HH:MM:SS:FF, where HH is hours, MM is minutes, SS is seconds, and FF is frames.

A format of the timecode packet for unencrypted timecode information is given in Table 1 of Appendix A. The timecode_id field uniquely identifies a particular timeline, allowing for multiple consecutive timelines. The status field indicates if the particular timeline is running or paused.

The timecode packet structure is preferably encrypted using any appropriate type of encryption, as described above, into a sequence of encrypted bytes and placed in an encryption container, such as, for example, and without limiting the generality of the foregoing, the encryption container given in Table 2 of Appendix A. The encryption container is then inserted into a PES packet.

Reference is now made to FIG. 7, which is a graphical diagram of timeline plotted against System Time Clock (STC), useful for understanding the system of FIGS. 1A and B. Specifically, FIG. 7 shows multiple timelines in the context of the system of FIGS. 1A and B. In a broadcast environment it is necessary to distinguish between multiple timelines. For example, one timeline may be for an interactive advertisement and another timeline may be for the current program.

The receiver preferably uses the timecode reference data conveyed in a timeline to compute Universal Co-ordinated Time (UTC) and STC values for a given content item, designated as content_id, and timeline pair. The reference data conveys entries for each discontinuity in STC with respect to timeline.

FIG. 7 depicts the following example where a single SI-event experiences the following transitions:

1. the event starts with its main program content (content_id=0) at STC=A
2. the event moves to commercial break and switches to content_id=1 at STC=B
3. the event switches back to the main program content at STC=C
4. an STC discontinuity occurs at STC=D where the STC is set to E. (Note, in the diagram E >D, but this may not be so in reality)

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

TABLE 1

Unencrypted timecode values

| Syntax | Bits | Mnemonic |
|---|---|---|
| timecode_packet( ) { | | |
|   num_values | 8 | uimsbf |
|   for (i=0; i<num_values; i++) { | | |
|     timecode_id | 8 | uimsbf |
|     hours | 5 | uimsbf |

TABLE 1-continued

Unencrypted timecode values

| Syntax | Bits | Mnemonic |
|---|---|---|
|     minutes | 6 | uimsbf |
|     seconds | 6 | uimsbf |
|     frames | 5 | uimsbf |
|     status | 2 | bslsbf |
|   } | | |
| } | | |

TABLE 2

Encryption container

| Syntax | Bits | Mnemonic |
|---|---|---|
| encryption_container( ) { | | |
|   encryption_type | 16 | uimsbf |
|   num_encrypted_bytes | 8 | uimsbf |
|   for (i=0; i<num_encrypted_bytes; i++) | | |
|   { | | |
|     encrypted_timecode_byte | 8 | bslsbf |
|   } | | |
| } | | |

What is claimed is:

1. A timecode generation method comprising:
receiving an encryption key and an implemented encryption method;
for each one of a plurality of frames, receiving a timecode and an associated presentation time stamp (PTS) associated with the one frame;
for each one of the plurality of frames, encrypting the timecode associated with the one frame using the encryption key and the implemented encryption method, thereby producing a plurality of encrypted timecodes; and
for each one of the plurality of encrypted timecodes, placing the encrypted timecode in an encryption container, thereby producing a plurality of encryption containers, each containing an encrypted timecode; and
for each one of the plurality of frames, for a time associated with the associated PTS associated with the one frame, inserting the encryption container containing the encrypted timecode associated with the one frame in a packetized elementary stream (PES), thereby outputting a packetized elementary stream (PES) comprising the plurality of encrypted timecodes.

2. The method according to claim 1 and wherein the implemented encryption method comprises an asymmetric encryption method.

3. The method according to claim 1 and wherein the implemented encryption method comprises a symmetric encryption method.

4. The method according to claims 1 and wherein the timecode comprises an offset from a broadcast headend station time.

5. The method according to claim 1 and wherein the one frame comprises at least one of the following: video; audio; and data.

6. A timecode generation method comprising:
receiving an encryption key and an implemented encryption method;
for each one of a plurality of frames, receiving a timecode and an associated decoding time stamp (DTS) associated with the one frame, the DTS occurring in advance of a presentation time stamp (PTS) associated with the one frame;

for each one of the plurality of frames, encrypting the timecode associated with the one frame using the encryption key and the implemented encryption method, thereby producing a plurality of encrypted timecodes; and for each one of the plurality of encrypted timecodes, placing the encrypted timecode in an encryption container, thereby producing a plurality of encryption containers, each containing an encrypted timecode; and for each one of the plurality of frames, for a time associated with the associated DTS associated with the one frame, inserting the encryption container containing the encrypted timecode associated with the one frame in a packetized elementary stream (PES), thereby outputting a packetized elementary stream (PES) comprising the plurality of encrypted timecodes, the PES comprising the plurality of encrypted timecodes not being effective until a time associated with the PTS associated with the one frame.

7. The method according to claim 6 and wherein the implemented encryption method comprises an asymmetric encryption method.

8. The method according to claim 6 and wherein the implemented encryption method comprises a symmetric encryption method.

9. The method according to claim 6 and wherein the timecode comprises an offset from a broadcast headend station time.

10. The method according to claim 6 and wherein the one frame comprises at least one of the following: video; audio; and data.

11. A timecode generator comprising:
a first input unit operative to receive an encryption key and an implemented encryption method;
a second input unit operative to receive a timecode and an associated presentation time stamp (PTS) for each one of a plurality of frames;
an encryptor operative to encrypt the timecode for each one of the plurality of frames, using the encryption key and the implemented encryption method, thereby producing a plurality of encrypted timecodes;
a processor operative to place timecode of the plurality of encrypted timecodes in an encryption container, thereby producing a plurality of encryption containers, each containing an encrypted timecode; and
a packetized elementary stream (PES) outputter operative to receive a plurality of encryption containers, each containing an encrypted timecode and, for a time associated with the associated presentation time stamp (PTS) associated with the one frame, inserting the encryption container containing the encrypted timecode associated with the one frame in a packetized elementary stream, to output a PES comprising the plurality of encrypted timecodes.

12. The timecode generator according to claim 11 and wherein the encryptor is operative to asymmetrically encrypt the timecode.

13. The timecode generator according to claim 11 and wherein the encryptor is operative to symmetrically encrypt the timecode.

14. The timecode generator according to claim 11 and wherein the second input unit receives timecode as an offset from a broadcast headend station time.

15. The timecode generator according to claim 11 and wherein the one frame comprises at least one of the following: video; audio; and data.

16. A timecode use method comprising:
receiving an application file comprising a decryption key and an implemented decryption method;
receiving a packetized elementary stream (PES) comprising a plurality of presentation time stamps (PTSs) and a plurality of encryption containers, each of the encryption containers of the plurality of encryption containers containing an encrypted timecode, each encrypted timecode being associated with one presentation time stamp (PTS); and
running the application file, the running comprising:
performing the following when a system time clock (STC) value equals a value of the one PTS associated with at least one of the encrypted timecodes:
decrypting the encrypted timecode associated with the value of the one PTS using the decryption key and the implemented encryption method, thereby producing a decrypted timecode.

17. The method according to claim 16 and wherein the decrypting comprises asymmetric decrypting.

18. The method according to claim 16 and wherein the decrypting comprises symmetric decrypting.

19. The method according to claim 16 and wherein each of the plurality of timecodes comprises an offset from a broadcast headend station time.

20. A timecode use method comprising:
receiving an application file comprising a decryption key and an implemented decryption method;
receiving a packetized elementary stream (PES) comprising:
a plurality of presentation time stamps (PTSs);
a plurality of a decoding time stamps (DTSs); and
a plurality of encryption containers, each of the encryption containers of the plurality of encryption containers containing an encrypted timecode, each encrypted timecode being associated with one decoding time stamp (DTS), at least one of the encrypted timecodes requiring that a display be updated at one of a plurality of presentation time stamps (PTS); and
running the application file, the running comprising:
performing the following when a system time clock (STC) value equals a value of the one DTS associated with at least one of the encrypted timecodes:
decrypting the encrypted timecode associated with the value of the one DTS using the decryption key and the implemented encryption method, thereby producing a decrypted timecode; and
updating the display at the one of the plurality of PTSs.

21. The method according to claim 20 and wherein the decrypting comprises asymmetric decrypting.

22. The method according to claim 20 and wherein the decrypting comprises symmetric decrypting.

23. The method according to claim 20 and wherein each of the plurality of timecodes comprises an offset from a broadcast headend station time.

24. A timecode handler comprising:
a first input unit operative to receive at least one application file comprising a decryption key and an implemented encryption method;
a second input unit operative to receive a packetized elementary stream (PES) comprising a plurality of encryption containers, each of the encryption containers of the plurality of encryption containers containing an encrypted timecode, each encrypted timecode being associated with a presentation time stamp (PTS); and a decryptor receiving each of the plurality of encrypted timecodes and operative to decrypt each of the plurality of encrypted timecodes using the decryption key and the implemented encryption method when a system time clock (STC) value equals a value of the PTS associated with each of the plurality of encrypted timecodes.

25. The timecode handler according to claim 24 and wherein the decryptor is operative to asymmetrically decrypt each of the plurality of encrypted timecodes.

26. The timecode handler according to claim 24 and wherein the decryptor is operative to symmetrically decrypt each of the plurality of encrypted timecodes.

27. The timecode handler according to claim 24 wherein each of the plurality of encrypted timecodes comprises an offset from a broadcast headend station time.

28. A method for timeline protection comprising:

receiving, at a timecode generator, an encryption key and an implemented encryption method;

for each one of a plurality of frames, receiving, at the timecode generator, a timecode and an associated presentation time stamp (PTS) associated with the one frame;

for each one of the plurality of frames, encrypting, at the timecode generator, the timecode associated with the one frame using the encryption key and the implemented encryption method, thereby producing a plurality of encrypted timecodes;

for each one of the plurality of encrypted timecodes, placing the encrypted timecode in an encryption container, thereby producing a plurality of encryption containers, each containing an encrypted timecode; and for each one of the plurality of frames, for a time associated with the associated PTS associated with the one frame, inserting the enryption container containing the encrypted timecode associated with the one frame in a packetized elementary stream (PES), thereby outputting a packetized elementary stream (PES) comprising the plurality of encrypted timecodes;

receiving, at a timecode handler, an application file comprising a decryption key and an implemented decryption method;

receiving, at the timecode handler, the PES comprising a plurality of presentation time stamps (PTSs) and a plurality of encryption containers, each of the encryption containers of the plurality of encryption containers containing an encrypted timecode, each encrypted timecode being associated with one presentation time stamp (PTS); and running the application file, the running comprising:
at the application file, performing the following when a system time clock (STC) value equals a value of the one PTS associated with at least one of the plurality of encrypted timecodes:
decrypting the encrypted timecode associated with the value of the one PTS using the decryption key and the implemented encryption method, thereby producing a decrypted timecode.

29. A system for timeline protection comprising:

a timecode generator comprising:
a timecode generator first input unit operative to receive an encryption key and an implemented encryption method;
a timecode generator second input unit operative to receive a timecode and an associated presentation time stamp (PTS) for each one of a plurality of frames;
a timecode generator encryptor operative to encrypt the timecode for each one of the plurality of frames, using the encryption key and the implemented encryption method, thereby producing a plurality of encrypted timecodes;
a timecode container packing unit operative to place each of the plurality of encrypted timecodes in a corresponding encryption container;
a timecode generator packetized elementary stream (PES) outputter operative to receive a plurality of encryption containers, each containting an encrypted timecode, and, for each one of the plurality of frames, for a time associated with the associated PTS associated with the one frame, to output a PES comprising one of the encryption containers containting an encrypted timecode associated with the one of the plurality of frames; and a timecode handler comprising:
a timecode handler first input unit operative to receive at least one application file comprising a decryption key and an implemented decryption method;
a timecode handler second input unit active to receive the PES comprising a plurality of encryption containers, each of the encryption containers of the plurality of encryption containers containing an encrypted timecode, each encrypted timecode being associated with a presentation time stamp (PTS); and
a timecode handler decryptor receiving each of the plurality of encrypted timecodes and operative to decrypt each of the plurality of encrypted timecodes using the decryption key and the implemented encryption method when a system time clock (STC) value equals a value of the PTS associated with each of the plurality of encrypted timecodes.

30. A timecode generator comprising:

means for receiving an encryption key and an implemented encryption method;

means for receiving a timecode and an associated presentation time stamp (PTS) associated with each one a plurality of frames;

means for encrypting the timecode associated with each one the plurality of frames using the encryption key and the implemented encryption method, thereby producing a plurality of encrypted timecodes;

means for placing the encrypted timecode in an encryption container, thereby producing a plurality of encryption containers, each containing an encrypted timecode; and means for outputting a packetized elementary stream (PES) comprising the plurality of encryption containers, each containing an encrypted timecode for a time associated with the associated PTS associated with each one the plurality of frames.

31. A timecode generator comprising:

means for receiving an encryption key and an implemented encryption method;

means for receiving a timecode and an associated decoding time stamp (DTS) for each one of a plurality of frames, the timecode and the DTS being associated with the one frame of a plurality of frames, the DTS occurring in advance of a presentation time stamp (PTS) associated with the one frame;

means for encrypting the timecode associated with the one frame using the encryption key and the implemented encryption method, thereby producing a plurality of encrypted timecodes for each one of the plurality of frames;

means for placing the encrypted timecode into an encryption container, thereby producing a plurality of encryption containers, each containing an encrypted timecode; and means for outputting a packetized elementary stream (PES) comprising the plurality of encryption containers, each containing an encrypted timecode, the PES comprising the plurality of encrypted timecodes not being effective until a time associated with the PTS associated with the one frame, the outputting occurring at a time associated with the associated DTS associated with the one frame.

32. A timecode handler comprising:

means for receiving an application file comprising a decryption key and an implemented decryption method;

means for receiving a packetized elementary stream (PES) comprising a plurality of encryption containers, each of the encryption containers of the plurality of encryption containers containing an encrypted timecode, each encrypted timecode being associated with a presentation time stamp (PTS); and means for running the application file, the running comprising:

performing the following when a system time clock (STC) value equals a value of the PTS associated with at least one of the plurality of encrypted timecodes:

decrypting the encrypted timecode associated with the value of the PTS using the decryption key and the implemented encryption method, thereby producing a decrypted timecode.

33. A timecode handler comprising:

means for receiving an application file comprising a decryption key and an implemented decryption method;

means for receiving a packetized elementary stream (PES) comprising:

a plurality of presentation time stamps (PTSs);

a plurality of a decoding time stamps (DTSs); and a plurality of encryption containers, each of the encryption containers of the plurality of encryption containers containing an encrypted timecode, each encrypted timecode being associated with one decoding time stamp (DTS), at least one of the encrypted timecodes requiring that a display be updated at one of a plurality of presentation time stamps (PTS); and means for running the application file, the running comprising:

performing the following when a system time clock (STC) value equals a value of the one DTS associated with at least one of the encrypted timecodes:

decrypting the encrypted timecode associated with the value of the DTS using the decryption key and the implemented encryption method, thereby producing a decrypted timecode; and updating the display at the one of the plurality of PTSs.

\* \* \* \* \*